May 21, 1946.   G. KEINATH   2,400,828
X-Y-RECORDER
Filed Dec. 24, 1942   4 Sheets-Sheet 1

INVENTOR.
GEORGE KEINATH.
BY
ATTORNEY.

May 21, 1946.    G. KEINATH    2,400,828
X-Y-RECORDER
Filed Dec. 24, 1942    4 Sheets-Sheet 2

INVENTOR.
GEORGE KEINATH.
BY
ATTORNEY.

May 21, 1946.　　　　G. KEINATH　　　2,400,828
X-Y-RECORDER
Filed Dec. 24, 1942　　　　4 Sheets-Sheet 3

INVENTOR.
GEORGE KEINATH.
BY
ATTORNEY.

May 21, 1946.　　　　G. KEINATH　　　　2,400,828
X-Y-RECORDER
Filed Dec. 24, 1942　　　　　　4 Sheets-Sheet 4

INVENTOR.
GEORGE KEINATH.
BY
ATTORNEY.

Patented May 21, 1946

2,400,828

UNITED STATES PATENT OFFICE 2,400,828

X-Y-RECORDER

George Keinath, Larchmont, N. Y.

Application December 24, 1942, Serial No. 470,087

21 Claims. (Cl. 234—5.5)

My invention refers to measuring systems for determining a function of two variable measuring magnitudes or quantities for controlling an indicating, recording or control mechanism in accordance with that function. More in particular, the invention is concerned with systems of the just-mentioned type in which the variation of neither of the two quantities is necessarily proportional to time. For instance, there are the requirements of indicating, recording, or using as a governing control the variations of an electric resistance in its functional relation to temperature, or the magnetic inductance of a ferromagnetic body in relation to the effective magnetic field strength, the voltage drop along a resistance body as a function of an electric current, the temperature of steam relative to its pressure, or the viscosity of a liquid in dependence upon pressure or temperature, to mention only a few examples of phenomena whose variations or quantities are of interest with respect to the present invention.

The general problem of determining and recording a function of two variable magnitudes or quantities has found a partial solution in the so-called X-Y-recorders in which a recording drum is revolved in dependence upon one of the magnitudes while the recording stylus moves under the control of the other thereby tracing a curve representing the function to be determined. However, while the above-stated operating principle of the known X-Y-recorders appears simple at first glance, the practical realization and according to the prior art involved difficulties and complications as to the necessary mechanical apparatus, as well as considerable limitations as to the uses and ranges of magnitudes for which this type recorder could heretofore be applied. These drawbacks are due to the rather intricate and heavy mechanism, involving the transmission of the relatively great forces and torques required in the known X-Y-recording apparatus, as well as to the electric measuring systems used for controlling the recording mechanism in accordance with the magnitudes to be determined.

It is an object of my invention to provide measuring systems for controlling an indicating, recording or control mechanism in dependence upon two variable magnitudes or quantities (both terms being used interchangeably in this specification) which reduce or avoid the above-mentioned shortcomings of the known X-Y-type recorders. An object, more specifically, is to simplify the mechanical apparatus required for the operation of such a system. Another object is to render the system sensitive to lower control magnitudes than heretofore properly applicable. Still another object deals with rendering the design and operation of such a system predominantly electrical, thereby contributing to simplification in mechanical respect and increased accuracy and reliability of operation. Other objects will be mentioned in a later place.

According to the invention, two adjustable measuring devices are provided for controlling two respective relays in accordance with the two control quantities supplied to these devices respectively. The adjustment of one device is cyclically varied by drive means in synchronism with a cyclical motion of a member of the mechanism, for instance a recorder drum, and the adjustment of the other measuring device is varied by actuating means in synchronism with the motion of another member of the mechanism, such as a recorder stylus, cooperating with the first-mentioned mechanism member. It is essential in this aspect of the invention that the two cooperative mechanism members be ineffective, i. e., run idle, during the just-mentioned synchronous motions and be rendered effective only when both relays have passed into responsive condition, an electric pilot circuit being provided between the relays and the mechanism to transmit a control impulse at the proper moment.

According to another feature of the invention, one of the above-mentioned synchronous drive or actuating means operates periodically while the other proceeds stepwise or, in general, in accordance with a given program of progression so that each step of progression involves at least one cycle of the periodic drive. In another aspect of the invention, one of the two drive or actuating means is operated in a cycle of a chosen period or recurring with a chosen frequency while the other is automatically governed by the operation of the mechanism to be controlled.

Since these and other objects and features of the invention are more easily understood in connection with concrete examples, reference is made to the embodiments shown in drawings before explaining other purposes and characteristics of the invention.

Figs. 1, 2 and 3 of the drawings refer to a single recording system, Fig. 1 showing some details, Fig. 2 a complete diagram of the system including its essential electrical and mechanical elements, and Fig. 3 a recording sheet with a record representative of those obtained by the system.

Figure 9:
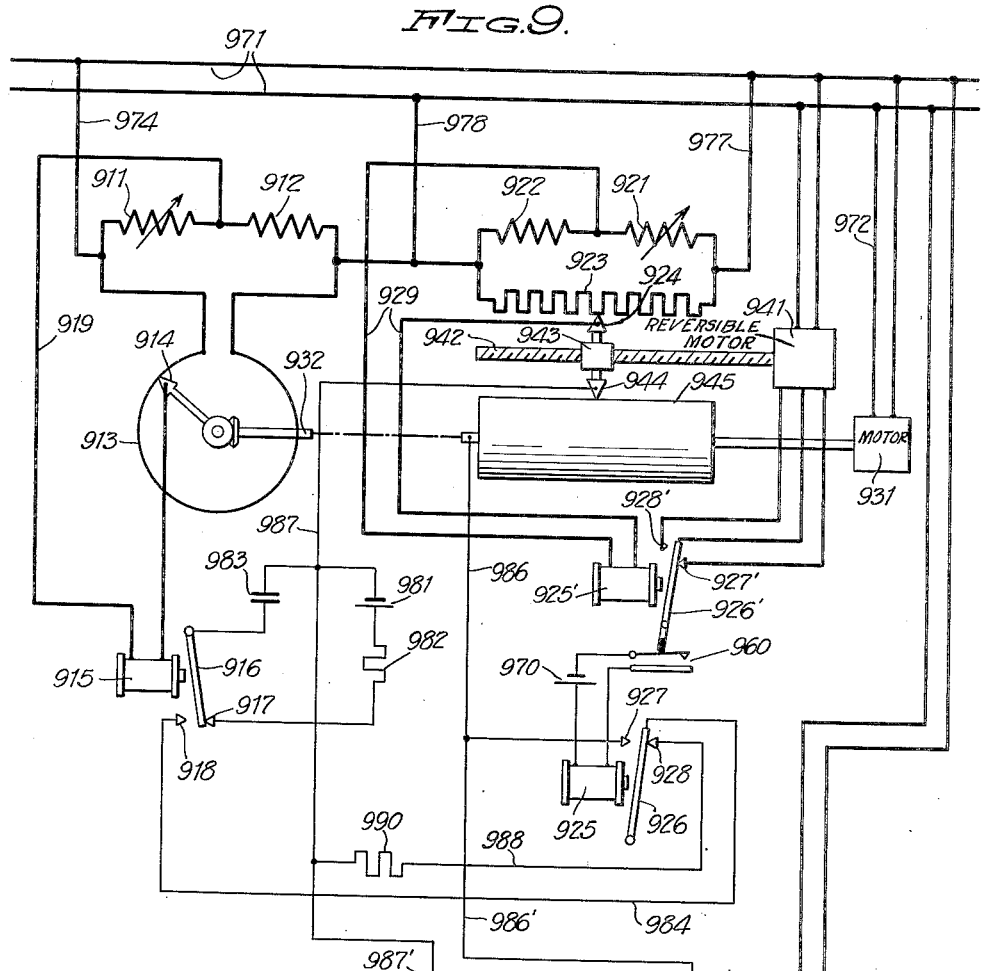
Fig. 9 represents still another embodiment and shows a complete circuit diagram of the system.
Figure 10:
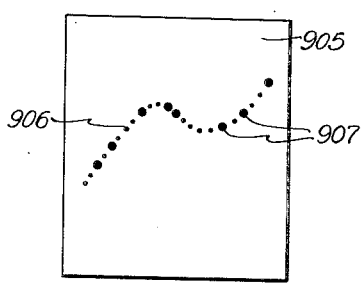

Fig. 10 relates to the system of Fig. 9 and shows a recording sheet with a record obtained in such a system.

Figure 1:
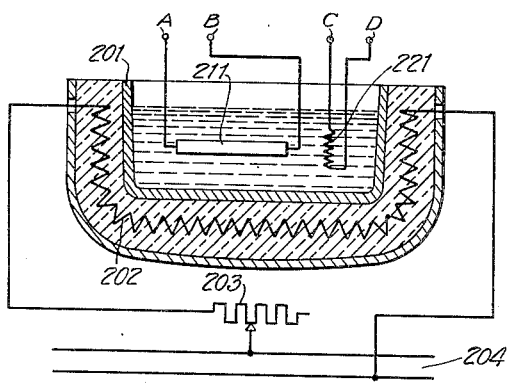
Figure 3:
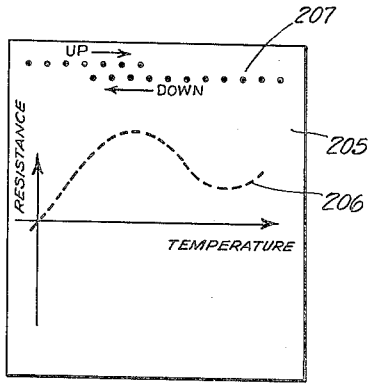
Figure 2:
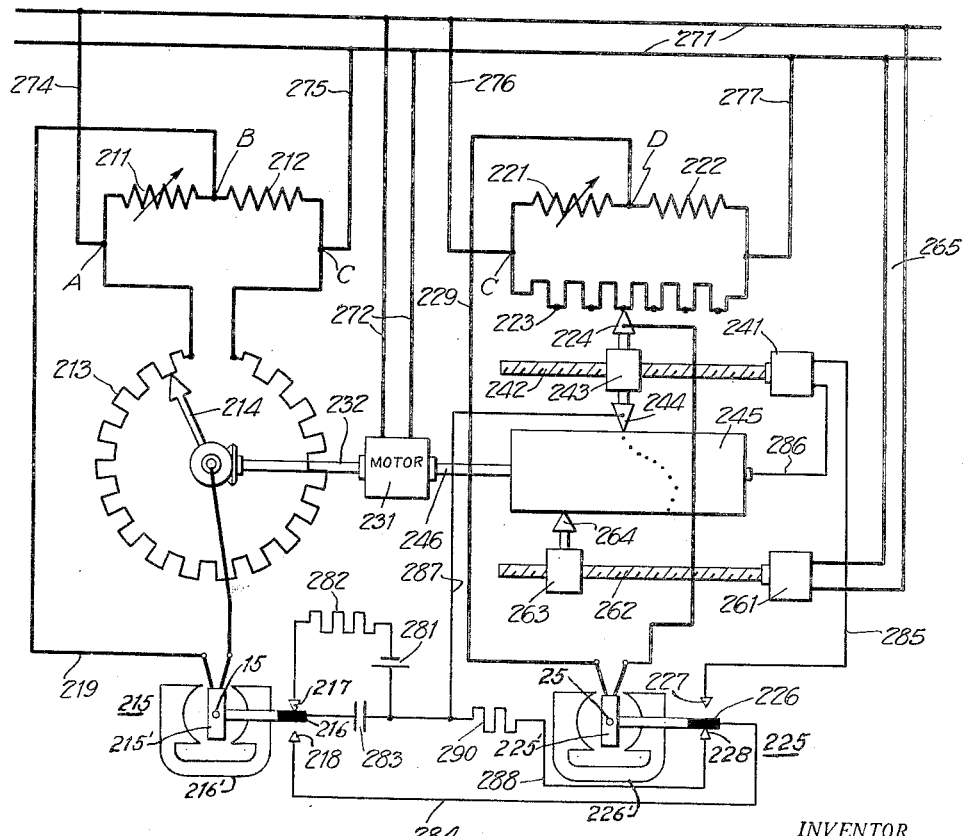

Referring at first to Figs. 1, 2 and 3, the illustrated system is intended to measure and record the change in the electrical resistance of a resistor in dependence upon its temperature.

According to Fig. 1, the resistance body 211 under investigation is connected with terminals A and B and submerged in an insulating bath in a heating vessel 201 provided with an electric heating element 202. The element 202 is connected with a current source 204 through a rheostat 203 which permits increasing and decreasing the bath temperature at will. A resistance thermometer 221, connected to terminals C and D, is also submerged in the bath for measuring the bath temperature.

The elements 211, A, B and 221, C, D respectively are connected in a measuring system as shown in Fig. 2 where the same reference characters are used for indicating the just-mentioned elements in their relation to the other parts of the system.

The system contains two separately adjustable measuring devices both consisting in this embodiment of balanceable electric circuits in the form of Wheatstone bridges.

The first bridge serves for determining the resistance magnitude of resistance body 211 and includes a constant resistance 212 and a potentiometric balancing resistor 213 which is of circular design and provided with a rotary slide contact 214. The slide contact 214 is connected in the zero branch or bridge diagonal 219 of the circuit in series with the coil 215' of a moving-coil galvanometer 215 serving as a relay. The coil 215' is rotatably mounted on a pin 15 between the poles of a permanent magnet 216' and controls a movable contact 216. Numerals 217 and 218 denote the stationary contacts to be engaged by the movable contact. The bridge circuit is connected by leads 274 and 275 with an energizing current source 271 of either direct current or alternating current.

When the potentiometer contact 214 performs one cycle of rotary motion, it passes through a position where the bridge circuit is balanced so that the diagonal current in branch 219 passes through zero and changes its direction. In the moment of balance, the relay 215 switches its movable contact 216 from stationary contact 217 to contact 218, or vice versa, depending upon the direction of rotation of slide contact 214. This effect may occur at different positions of the slide contact relative to the resistor 213, depending upon the instantaneous magnitude of the variable resistance body 211. Hence, the angular position of the slide contact 214 at the time of the switching-over of relay 215 is indicative of the resistance magnitude to be measured.

The second bridge circuit serves to measure the temperature as represented by the variable resistance of the resistance thermometer body 221. This bridge includes also a constant resistance 222 and a potentiometric balancing resistor 223, and is energized through leads 276 and 277 from the current source 271. The potentiometer resistor 223 is of straight construction and cooperates with a reciprocatory slide contact 224 disposed in the diagonal 229 of the bridge in series arrangement with the moving coil 225' of a galvanometric relay 225. The coil 225' is mounted on a rotatable pin 25 between the poles of a magnet 226' and has a movable contact 226 cooperating with two stationary contacts 227 and 228. The movable contact changes its position when the bridge passes through the balance condition, that is, when the adjustment of the balancing potentiometric device is indicative of the temperature magnitude to be determined.

Associated with the two adjustable measuring devices described in the foregoing is a recording mechanism with two cooperative members consisting of a reciprocatory stylus 244 and a revolving drum for accommodating a recording sheet. The drum 245 and the potentiometer contact 214 are rotated or actuated periodically and in synchronism with each other. The drive means for effecting the synchronous motion include an electric motor 231 fed from the current source 271 through leads 272 and connected with the contact 214 and the recorder drum 245 by shafts 232 and 246 respectively. The recorder stylus 244 and the potentiometer contact 224 are likewise operated in synchronism with each other, and to this end are attached to a holder 243 actuated by a worm shaft 242 which in turn is driven by a motoric device 241. However, while the periodic drive effected by the motor 231 operates in continuous motion, the actuating device 241 is of the type of a step switch, i. e., it operates intermittently, advancing the contact assembly of members 224, 243, 244 step by step over a graduated range of progression. As will be set forth in a later place, the operating period of the actuating device 241 and the members driven thereby is longer than that of the drive 231, so that the rotating potentiometer contact 214 completes its cycle once or several times during each step of progression of the intermittent actuation.

The recorder mechanism is so designed that the motion of stylus and drum does not in itself produce a record on the sheet placed on the drum. An electric pilot circuit is provided for controlling the writing operation of the stylus so as to limit it to selected moments or intervals. An ink recorder having the flow of ink controlled by the electric circuit could be used for this purpose. However, an especially simple and reliable operation is obtained if the stylus and drum members form electrodes to pass, when energized, a discharge current through an electrolytic, i. e., current-responsive, recording sheet, thereby producing a recording mark on the sheet only at the time of the current flow. This type recorder is used in the illustrated system, an electric pilot circuit being connected with the two electrode members, i. e., the drum and the stylus, of the recorder, as will be explained presently.

The movable contact 216 of the relay 215 is connected with one pole of a capacitor 283. The stationary contact 217 of the same relay lies in series with a current-limiting resistor 282 and a current source 281 which in turn is connected to the other pole of the capacitor 283. When the movable contact 216 engages the stationary contact 217, the capacitor is charged from the current source 281. A connection 284 leads from the stationary contact 218 to the movable contact 226 of the other relay 225. The stationary contact 221 of relay 225 is connected by a lead 285 with the actuating device 241; another lead 286 connects the latter with the drum 245 of the recorder whose stylus 244 is connected through lead 287 with the capacitor 283. Connected between the capacitor 283 and the other stationary contact 228 of relay 225 is a discharge path 288 which may contain a current-limiting resistor 290. The leads numbered 284 through 287 and the appertaining relay connections form the above-mentioned pilot circuit, as will be better apparent from the following description of the relay operation.

The illustrated positions of both relays correspond to the inoperative condition of the pilot circuit. As long as during each rotation of contact member 214, beginning from its initial position, the member has not passed through the balance position, the relay contacts 216 and 217 remain engaged with each other so that the capacitor is charged but not in condition for discharge. When contact 214 passes through its balance position, relay contact 216 switches over to contact 218. Assuming that relay 225 is still in the illustrated position, the capacitor discharges itself immediately through the discharge path 288 closed over contacts 226 and 228. Hence, the discharge has no effect on the recorder and decays quickly while the potentiometer contact 214 continues its motion and the contact 216 remains in engagement with contact 218. However, if at the time of discharge the relay 225 has also responded to the passage through balance of the reciprocatory contact member 224 of the appertaining potentiometer, the short circuit through path 288 is eliminated and the discharge of the capacitor passes from lead 284 through contacts 226 and 228, then in engagement with each other, to lead 285, the actuating step switch 241 and the recorder members 245 and 244. As a result, a recording mark is produced on the recording sheet.

As described, the actuating device 241 is also connected in the pilot circuit in order to be controlled thereby. Each discharge impulse passed through the recorder thus causes the device to move the assembly of members 224, 243 and 244 one step along their path of progression.

Reviewing the system as a whole, its operation will now be understood from the application exemplified in the following.

Let us assume that the container, bath and submerged elements, shown in Fig. 1, are in cold condition and that the resistance-temperature characteristic of the resistance body 211 is to be determined by recording a corresponding curve. We proceed by heating the bath up to a maximum temperature of say 300° centigrade by energizing the heater 202. At the beginning of the heating period, the drive motor 231 is set in operation so that the potentiometer contact 214 and the recorder drum 245 begin their periodical rotation and continue to operate during the entire heating and measuring period. The reciprocatory potentiometer contact 224 and the stylus 244 remain at first stationary on the starting point, for instance at the right-hand side of their path of motion. In this position, the potentiometric balancing resistor 223 is contacted by member 224 at a point which corresponds to a temperature slightly above the initial bath temperature, the difference being, for instance, 3° centigrade. The rotating contact 214 during its continuous travel will now pass through its balance point during each of its cycles. Each time this point is traversed, the relay 215 is actuated and the capacitor 283 discharged to be recharged after the completion of the cycle. However, as long as the temperature remains below that to which the contact 224 is adjusted, the resistance of control element 221 is too low to balance its appertaining bridge circuit. Consequently, the relay 225 remains in the illustrated position so that the first discharge of the capacitor, or several successive discharges pass through the short circuit path 288 and have no effect on the recorder and the step switch 241. As soon as the temperature measured by control element 221 reaches the degree corresponding to the program point to which contact 224 is adjusted, the appertaining bridge passes through balance and causes the relay 225 to disconnect the path 288 while connecting the pilot lead 226 with the discharge circuit. The next discharge effected by relay 215 must now pass through the recorder and produce a recording mark on the recording sheet. Immediately afterward, the step switch, also energized by the discharge current, moves the contact 224 and stylus 244 one step forward to the second program point representing a higher degree of temperature, the difference being, for instance, again 3° centigrade. As a result, the relay 225 drops back to the original, illustrated position as soon as a recording mark is produced. In this moment, the slowly rising bath temperature lags behind that prescribed by the new position of the contact 224. Consequently, the next discharge, or several of them, will be ineffective until the control element 221, responsive to the rising bath temperature, is again in condition for balancing the bridge circuit. Then the relay 225 is actuated so that the next discharge issuing through relay 215 will produce a second recording mark while causing the potentiometer contact 224 to advance a further step and the relay 225 to return to its initial position. This operation repeats itself until the desired measuring range is covered.

The curve thus recorded on the recording sheet is of the type shown in Fig. 3. This figure represents a sheet 205 taken from the recorder drum. The curve 206 is composed of a number of successive marks or points, each produced during one step of the above-described operation of the system. Since the angular position of the drum at the time of each discharge is correlated to that of the potentiometer contact 214 and hence indicative of the resistance value of body 211, and since the discharge is effective only when the preadjusted position of the potentiometer contact 224 and the stylus 244 corresponds to the temperature measured by element 221, each mark, as to its location in the coordinate system of the recorded diagram, represents a function of both control magnitudes. The curve 206 is a locus of such functions and hence representative of the characteristic to be determined.

The accuracy of measurement depends on the operating speed of the rotating potentiometer relative to the rate of change of the temperature to be measured. That is, the accuracy can be increased within wide limits by increasing the speed of rotation or lengthening the heating period, or both. The speed of rotation may easily be kept at such a value as to permit measuring rather fast-changing phenomena, lasting, for instance, but a few minutes or seconds. The accuracy of operation depends also on the gradation of the step drive and its appertaining potentiometer. The higher the number of steps, a corresponding rotating speed of contact 214 being provided for, the more closely will the recorded curve be similar to the controlling phenomena. For the above-exemplified purpose, a gradation into 50 to 100 steps, for instance 100 steps each for a temperature difference of 3° centigrade, may be chosen for a temperature range of 0 to 300° centigrade.

After the completion of the recording operation, the assembly of members 224, 243 and 244 is returned into its original position in order to reset the system for another recording. If it is required to measure changes in both directions, however, the actuating means are preferably made reversible so that the assembly 224, 243 and 244 is stepwise returned while operating the system in the same manner as described above, except that now the bath with its submerged elements is now permitted to cool to a low temperature. The reversal can be obtained by using a polarized reversible step switch or by a mechanical reversing gear of which many types are available. It is preferable to reverse either the polarity of relay 224 or the connections or contacts 227 and 228 together with the reversal of the stylus motion. An example of reversing means, applicable in the system of Fig. 2, will be described more in detail in connection with Fig. 4.

In cases where an indication of the duration of the measuring operation is desired, the recorder may be provided with a time-marking device. Fig. 2 shows such a device. It contains a second stylus electrode 264 attached to a holder 263 which is moved along the drum 245 in proportion to time by means of a threaded shaft 262 operated by a motor 261 connected through leads 265 with the current source 271. In intervals of equal duration of say 5 or 10 seconds, a current discharge is passed from the stylus 264 onto the recording sheet, producing time marks as shown at 207 in Fig. 3. If both motors 231 and 261 are synchronous, the time marks appear in one row in parallel to the drum axis, and it is easy to place them on a convenient space of the recording sheet, preferably those for the upward movement separated from those for the downward movement, merely by correspondingly selecting the phase position of the time-marking discharges relative to the rotation of the drum. A contactor (not shown) driven by motor 261 over an angularly displaceable control cam may be used for this purpose.

It will be apparent that the construction and operation of a measuring system of the above-described type remains the same if the temperature variation is measured by the arrangement having the periodically operating potentiometer while the controlling resistance variation is effective in the arrangement having the stepwise actuated potentiometer. It will likewise be seen that not only resistance-temperature characteristics but any other phenomena can be caused to operate the system as long as these phenomena can be reduced to variations of an electric circuit member. However, it will be shown in the following that such systems are also applicable with any other electrical or non-electrical magnitudes capable of controlling a relay by a differential effect in cooperation with an independently variable adjusting element. The principles of construction and operation of the system, aside from the particular measuring purpose involved, are also capable of modification in various respects. This will be clear from the embodiments of Figs. 4 through 7 to be described hereinafter.

To facilitate a comparison of Figs. 4 through 7 with Fig. 2, and in order to permit shortening the description of these other embodiments, the last two digits of the reference numerals employed in all figures are equal when referring to functionally similar elements.

Figure 4:
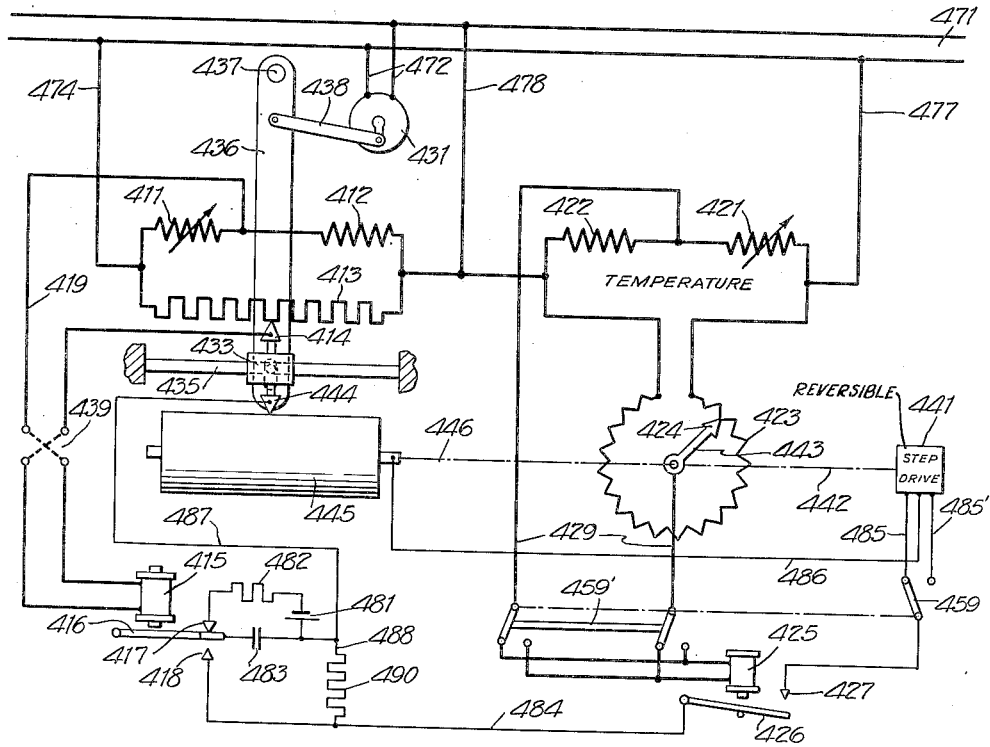
Figs. 4, 5 and 6 illustrate three further embodiments, respectively, each designed as a recorder system.

The system shown in Fig. 4 serves to record a function of two variable control magnitudes represented by corresponding resistance variations of two respective circuit elements 411 and 421.

The circuit element 411 lies in a bridge circuit which contains also a constant resistor 412 and a potentiometric balancing resistor 413 whose movable slide contact 414 is disposed in the zero branch 419 of the circuit in series connection with a relay 415. The relay is of the polarized type, a reversing switch 439 being provided in order to change the direction of operation of the relay.

445 represents the drum member and 444 the stylus member of a recorder. Both members form electrodes for passing a current discharge through the recording sheet, preferably of the electrolytic type, placed on the drum 445.

The stylus member 444 is connected with the potentiometer contact 414 by means of a common holder 433 which is reciprocable along a straight guide 435. The holder 433 is coupled with an arm 436 journalled about the fulcrum 437 and in driving connection with a pitman 438 actuated by a synchronous motor 431 which is energized from the line 471 through leads 472. When in operation, the motor 431 causes the arm 436 to perform periodic oscillations thereby reciprocating the assembly of members 414, 433 and 444 along the recording drum 445 and the sheet placed thereon. During its periodic travel, the assembly passes through a position which at that particular moment is indicative of the resistance value of circuit element 411 for the reasons previously explained with reference to Fig. 2. The relay 415 has a movable contact 416 cooperating with two stationary contacts 417 and 418. The movable contact changes its position each time the potentiometer contact 414 passes through the balance position.

The above-mentioned reversing switch or pole changer 439 is connected in the zero branch 419 so as to reverse the polarity of relay 415 when actuated. This switch is controlled by the reciprocating assembly of elements 436 and 433, for instance, by means of so-called end switches (not illustrated) so as to effect a pole change each time the assembly reaches either end of its travel. As a result, the apparatus is operative in both directions of motion of the assembly.

The variable circuit element 421 is connected in a bridge circuit containing a constant resistor 422 and a balancing potentiometric resistor 423 whose movable contact 424 is series connected with a second relay 425 in the zero branch 429 of the bridge. Contact 424 is attached to a rotary arm 443 which is actuated through a connection 442 from an intermediate step drive 441. A similar connection 446 causes the recorder drum 445 to rotate in synchronism with the contact 424. The relay 425 is actuated as soon as the resistance magnitude of circuit element 421 corresponds to the position of contact 424 relative to the potentiometric resistor 423. The movable contact 426 of relay 425 cooperates with stationary contacts 427 and 428 which are connected through a reversing switch 459 and lead 485 with the step drive which in turn is connected with the drum member 445 by a lead 486. The pilot circuit thus formed is completed by a connection 487 leading from the stylus electrode 444 to the first-mentioned relay and by another lead 484 connecting the movable contact 426 of relay 425 also with the contact assembly of relay 415. A discharge circuit containing a current source 481, a resistor 482 and a capacitor 483 is so connected with the contacts of relay 415 that the capacitor is charged when the relay is in non-responsive position and discharged into the pilot circuit as soon as the relay assumes its responsive position. If, at the time of this action, the relay 425 is also in responsive condition thereby connecting its movable contact 426 through the stationary contact 427 with the step drive and the recording device, a control impulse is passed through the pilot circuit thereby causing the stylus electrode to produce a mark on the recording sheet and at the same time moving the step drive one step forward as explained when describing the corresponding operation of the system shown in Fig. 2. However, if at the moment of response of the relay 415 the second relay 425 is non-responsive, as is illustrated in Fig. 4, the discharge from capacitor 483 passes through a short-circuiting path 488 which contains a resistor 490. As a result, the discharge is now rendered ineffective as regards the operation of the pilot circuit proper. In order to ensure the just-mentioned function, the resistance of resistor 490 must be high as compared with that of the pilot circuit. Assuming, for instance, that the series resistance of the step drive and the recording device in the pilot circuit is about 5000 ohms, a high ohmic resistor 490 of about 50,000 ohms may be chosen.

The actuating motor 441 is of the reversible type. Its direction of operation is controlled by a reversing switch 459 which, depending on its position, connects either lead 485 or 485' with the relay contact 427. A second reversing switch 459' is coupled with switch 459, as is indicated by a dot-and-dash line. Switch 459' reverses the leads 429 as to their connection with the relay 425. Switches 459 and 459' permit adjusting the actuating means 441 at will or automatically to operate in either direction.

It will be seen that despite the different construction of the measuring system according to Fig. 4 as compared with the system previously described, the operations of the two systems are similar as regards the essential features of the invention.

Figure 5:
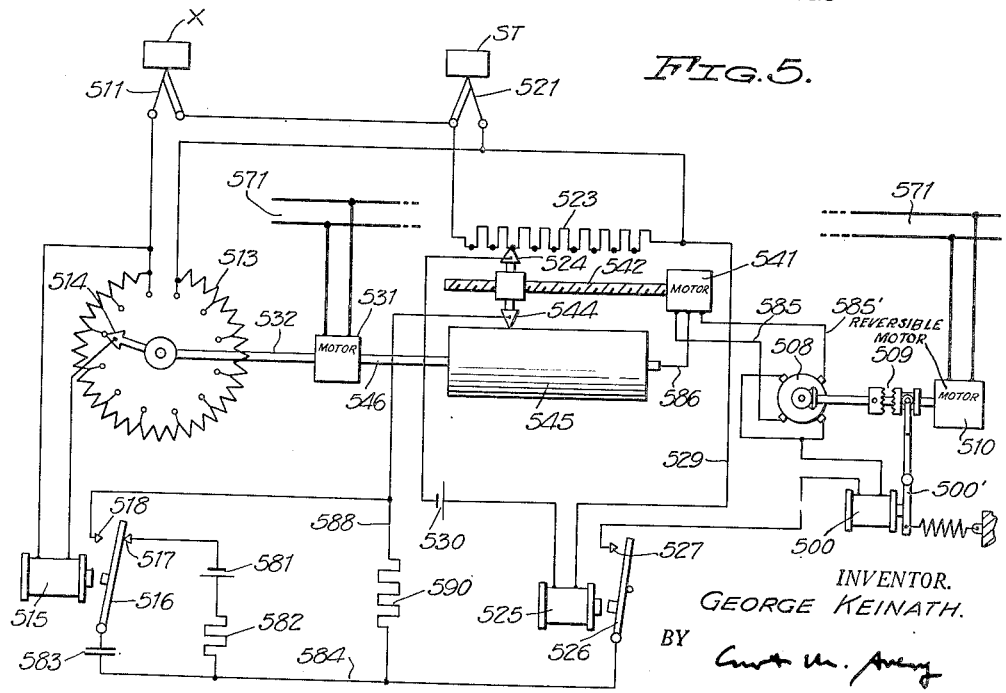

Fig. 5 exemplifies a system for controlling a mechanism in dependence upon two variable voltages. The illustrated system serves for determining the critical temperatures of steel by comparing a specimen X with a standard piece of porcelain or another material, such as nickel, which shows a continuous change of temperature within the temperature range under observation. Two thermocouples 511 and 512 serve to measure the temperature of the specimen X and the standard ST respectively. Both couples are series connected with the terminals of a potentiometric resistor 513 and a relay 515. The movable contact 514 of the potentiometer is connected with the other pole of the same relay. The resistor 513 is subdivided into a number of steps so that the contact 514, during its operation, changes the voltage drop effective across the relay 515 in steps corresponding to the gradation of the resistor 513. The potentiometer is of the circular type and the shaft 532 of the rotary contact 514 is driven by a motoric device 531. An electric motor or some other motoric means may be used for this purpose.

The just-mentioned measuring and relay circuit is not of the balanceable type but involves a threshold principle. That is, the relay 515 has a definite minimum requirement as to the voltage necessary for moving the movable contact 516 from stationary contact 517 to stationary contact 518. Assuming a proper direction of rotation of the contact 514, the voltage drop across relay 515 is below the threshold or minimum value when the contact begins its cycle of operation. During its path of travel, the contact will reach a resistance step of resistor 513 where the relay voltage passes beyond the threshold value. Consequently, at this moment the relay will respond, the phase position of the contact in this instant being respective of the voltage difference of elements 511 and 512. The resistance steps of resistor 513 are preferably so dimensioned that their resistance value increases in each subsequent step along the path of contact motion; an increase of the resistance steps in accordance with an inverse hyperbolic law is especially favorable as is explained in detail in my copending application, Serial No. 402,170, filed July 12, 1941, now to issue as Patent No. 2,303,391.

The thermocouple 521 is also directly connected with a second potentiometer resistor 523 whose slide contact 524 is series connected with a relay 525 and a current source 530 for providing a bucking voltage. The arrangement is such that the circuit represents a balanceable potentiometric network so that a reversal of the current occurs in the branch of the relay 525 when the contact 524 passes through a balance point whose position relative to the resistor 523 depends upon the magnitude of the voltage supplied by the thermoelement 521. The contact 524 is connected with a stylus electrode 444 of a recording device, and both are actuated by means of a worm shaft 542 under control of an intermediate step drive 541. The drum member of the recording device is designated by 545.

A discharge circuit containing a capacitor 583, a current source 581, and a resistor 582 is connected through leads 584, 585, and 587 with the recording device and the step drive through the movable contact 526 and the stationary contact 527 of the relay 525, a short circuit path 588 containing a high ohmic resistance 590 being connected in parallel to the recording device and the step drive.

Connected with the pilot circuit is also a relay 500 of the retarded type in series arrangement with a rotary reversing switch 508 with two switching positions. In the illustrated position, relay 500 is connected with lead 585 to run the actuating device in one direction. In the other position of switch 508, relay 500 is connected with lead 585' to cause device 541 to operate in the other direction. The switch 508 is controlled by the relay armature 500' in cooperation with a coupling 509 and a drive 510. The operation of these elements will be explained in a later place. Assuming for the present that during a given period the coupling 509 is kept disengaged by relay 500 and the switch 508 is at rest in the illustrated position, it will be recognized that the operations of pilot circuit and recording device are similar to those of the corresponding parts of the other embodiments despite the fact that the variable circuit elements supply voltages and are connected in measuring arrangements different from those previously described.

Figure 6:
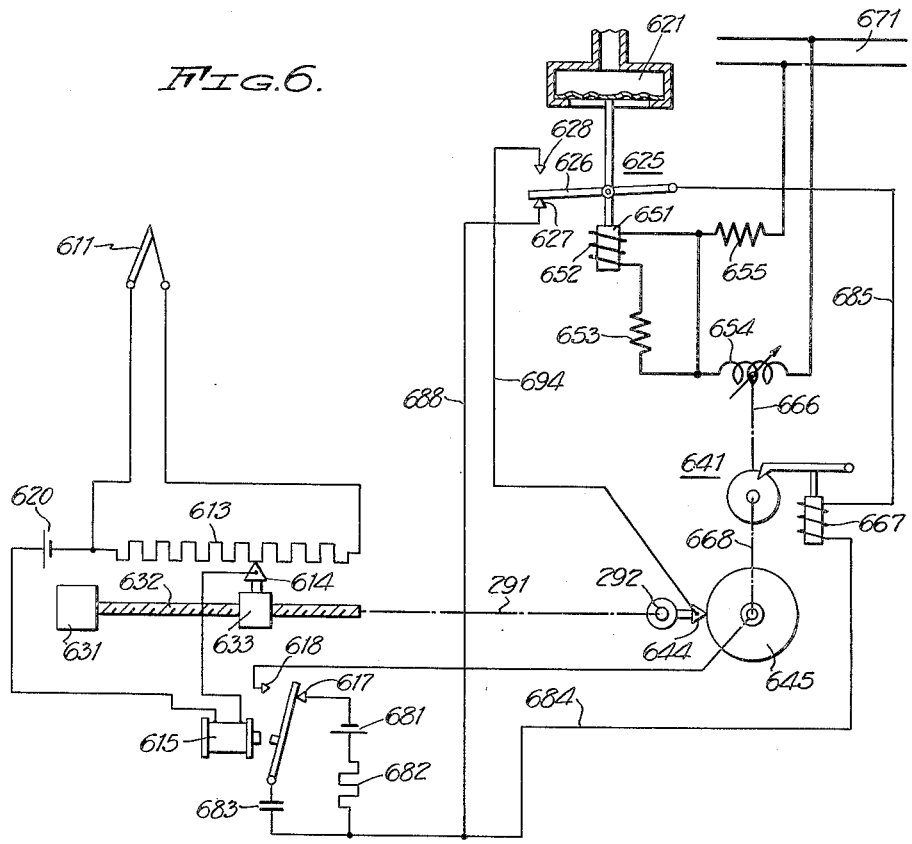

The system shown in Fig. 6 serves, for instance, for determining the relative magnitudes of the temperature and rate of flow of a fluid. The control element responsive to the temperature consists of a thermocouple 611 which supplies a variable voltage in accordance with the temperature variations to be measured. The rate of flow is measured by means of a pressure gauge 621.

The thermoelement 611 is connected in a balanceable potentiometric network containing the potentiometer resistor 613 and its movable contact 614 in series connection with a relay 615 and a source 620 of a bucking voltage. The contact 614 is carried by a holder 633 which is periodically reciprocated along the resistor 613 by means of a transmission 632 driven by a suitable motoric device 631. The pressure gauge 621 acts on the movable contact 626 of a differential relay 625. An armature 651 also connected with the movable relay contact 626 and controlled by a magnet coil 652 serves to supply the counteracting force for operating the relay. The coil 652 is connected in an adjusting circuit which is energized from the line 671 and contains two constant resistors 653 and 655 and a variable impedance member 654 consisting for instance of a variable inductance. By varying the effective impedance value of member 654, the energization of the coil 652 is changed correspondingly so as to balance the effect of the pressure gauge in a position of adjustment of the element 654 which is indicative of the pressure magnitude to be determined. It will be seen that the measuring arrangement containing a pressure gauge is again different from all of those previously described. In the system of Fig. 6, a balance is obtained not within an electric circuit but within a mechanically operating relay mechanism. However, this arrangement has also the effect of controlling a relay in a moment when an adjusted program magnitude becomes equal or assumes a predetermined ratio to the variable control magnitude.

The rest of the system shown in Fig. 6 is substantially similar to those previously described. The drive means of contact 614 are connected with the drive element 292 of the stylus electrode 644 of a recording device, while the drum member 645 of this recorder is actuated in synchronism with the adjustable impedance member 654 by means of a step switch 667 connected with the drum and the impedance member by shafts 668 and 666 respectively. The recording device in Fig. 6 is shown in a lateral view so that the periodic and oscillatory motion of the stylus 644 occurs in a direction perpendicular to the plane of illustration. The pilot and discharge circuits controlled by relays 615 and 625 contain a capacitor 683, a current source 681, a resistor 682, a shunt path 689 and the leads 684, 685, and 688, these elements being connected with each other and with the recorder and the step drive in a manner similar to the corresponding parts of the systems previously discussed.

Figure 7:
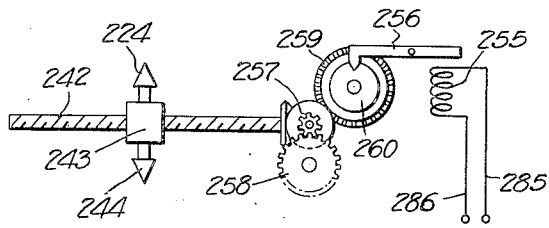
Fig. 7 shows diagrammatically a modified actuating means applicable in the system of Fig. 2, or in any of the other systems.

When describing the foregoing embodiments, it has been assumed for the sake of simplicity that the intermediately operating actuating means consist of a switch-like device which moves the appertaining potentiometer contact and stylus electrode step by step each time a control impulse is supplied to the actuating device. Although it is possible and advantageous, as regards some uses of systems according to the invention, to energize the actuating means directly by the control impulse supplied by the pilot circuit, as is illustrated in Fig. 6 (element 667), it is frequently desired to operate with relatively weak currents in the pilot circuit and to control relatively high torques. For this reason, it is preferable to provide the intermediate actuating means with an auxiliary energy source and to use the pilot circuit only for governing the effect of this source. An example of this type is shown in Fig. 7. It is assumed that the illustrated mechanism forms part of the system of Fig. 2 and that the actuating device serves for rotating the worm shaft 242 carrying the reciprocable holder 243 with the potentiometer contact 224 and the stylus electrode 244. According to Fig. 7, the shaft 242 is rotated by means of a bevel gear 257 which in turn is driven by a driving gear 258. The latter gear is actuated by a clockwork, electric motor, or any other suitable auxiliary energy source. Coupled with the mechanism is also a gear 259 meshing with one of the wheels of the bevel gear and carrying a cam 260 with one notch engaged by a detent 256. A magnet coil 255 connected with the leads 285 and 286 of the pilot circuit serves to release the detent when energized by a control impulse. The release of the detent has the effect that the cam 260 and the gear 259 are permitted to perform a single rotation corresponding to one step of progression of the potentiometer contact. The controlling energy for operating such a relay type of device is very low so that the dimensions of the discharge circuit can be kept within convenient limits.

When describing the system represented by Figs. 1, 2 and 3, it is assumed in the foregoing that the phenomenon to be observed is controllable as to the direction of its change and that the slow-acting of the two measuring arrangements is adjusted, as to its sense of progression, to that direction. However, it is also an object of my invention to provide systems of the type here described, which involve a reversible automatic operation so as to respond to control magnitudes of varying direction. The means according to the invention for achieving such an operation will be explained presently.

Referring to Fig. 2, for instance, it is obvious that the cyclically operating potentiometer 213, 214 and the appertaining measuring device will cause the relay 215 to respond to the instantaneous magnitude to be measured by variable element 211 regardless of whether the magnitude increases or decreases and despite the fact that the sense of rotation of the potentiometer contact 214 remains the same. Hence, this part of the system is inherently capable of responding properly to directional changes of the controlling magnitude. In contrast thereto, the second measuring device containing the variable element 221 requires for its proper operation a direction of contact motion depending on the direction of change of the appertaining control magnitude. If the magnitude reverses its direction of change while the system is in operation, the independently operating potentiometer 213, 214 would continue to actuate its relay 215, but the programmatically operating arrangement would keep its relay 225 inactive and thus stop operating until the change of the magnitude of element 221 has again assumed the original direction and progresses up to the program value prescribed by contact 224.

It follows from the foregoing that in order to render such a system capable of reversible operation, merely the last-mentioned potentiometric device need be designed for an automatic reversion of its motion. This may be effected, according to the invention, in two different ways. One way is to control the actuating means of this potentiometer indirectly, in particular by reversing the direction of its motion in response to the cessation of the proper operation of the system. The other way is to effect a direct control by reversing the motion in immediate response to directional changes of the primary control magnitude. These two aspects of the invention are exemplified in the following with reference to Figs. 5, 8 and 9.

Reverting to the elements 500, 508, 509, 510, 585, 585' and 541 of the measuring system shown in Fig. 5, the design and function of these elements will now be set forth in detail. The drive 510 is operated in proportion to time, for instance by a synchronous motor, clockwork or the like, so as to actuate the rotary reversing switch 508 in given intervals. That is, this drive tends to reverse in regular intervals the direction of motion of the actuating device 541 and the assembly 524, 544 driven thereby. A reversal of switch 508, however, occurs only if coupling 509 is closed at the proper moment but does not take place if the coupling is disengaged. The relay armature 500' is spring-biased and causes the coupling 509 to establish a driving connection between drive 510 and switch 508. When attracted by the relay 500, as is shown in Fig. 5, the armature disengages the coupling 509. Relay 500 is a time relay and hence keeps the coupling disengaged for a given period after each energization of the relay, the time constant being so chosen that the period of retardation is safely longer than the longest period of time which normally elapses between two subsequent recording operations, i. e., subsequent operations of the pilot circuit.

Figure 8:
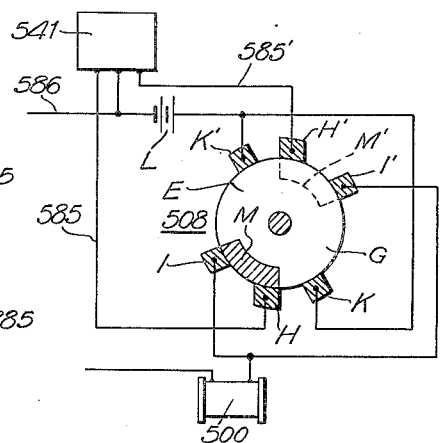
Fig. 8 shows part of the system of Fig. 5 more in detail and on a larger scale.

The showing of switch 508 in Fig. 5 is simplified for reasons of illustration. As to details of this switch, reference should be had to Fig. 8 representing the switch 508 with all necessary contacts and connections. The switch has a rotary contact member E mounted on the shaft F controlled by the coupling 509 (in Fig. 5). Member E carries a contact bridge M which in one position connects contacts H and I, and, in its other position, i. e., rotated 180° into the position M', connects contacts H' and I'. The direction of rotation is marked by arrow G. Two contacts K and K' are connected through a current source L with lead 586 of the pilot circuit. Contacts H and H' are connected with leads 585 and 585' respectively, and contacts I and I' are connected with the retarded relay 500.

The reversing device operates as follows. Let us consider a moment in which an increasing magnitude of element 521 is being recorded with the reversing control elements 500, 508, 509 and 500' in the illustrated positions (Figs. 5 and 8), armature 500' still being attracted due to a recent energization of relay 500. Now, before the period of retarded action of armature 500' elapses, a new control impulse occurs in the pilot circuit and energizes relay 500. As a result, a new retarding period starts running. This is repeated as long as the magnitude of element 521 continues to increase. Hence, the coupling 509 remains disengaged and the switch 508 stays inoperative during the entire period just discussed.

Let us now assume that the measuring magnitude of element 521 has reached its peak value and starts declining. Then, no control impulse will pass through the pilot circuit for the reason explained previously. After elapse of the period of retarded action, armature 500 drops off and causes coupling 509 to establish a driving connection between drive 510 and switch 508. The next driving impulse caused by drive 510 will then turn the switch 180°, placing contact bridge M in the position M' (Fig. 8). In this position, lead 585 is disconnected while the pilot circuit from relay 500 now extends over lead 585' to device 541. That is, the direction of motion of device 541 is now reversed. Before reaching the position M', the contact bridge M forms a temporary connection between contacts K' and H' and thus connects the current source L with lead 585'. The resulting energizing impulse, passed through device 541, causes the latter to move one step in the direction opposite to that of its preceding operation. Due to this backward motion, the contact catches up with the declining value of the magnitude of element 521, or rather moves to a program point below that magnitude. When, now, the declining control magnitude reaches the balance value corresponding to the new position of contact 524, a control impulse is passed through the pilot circuit and causes the recorder to produce a recording mark and the actuating device 541 to move the contact 524 and stylus 544 one step farther in the direction of decline of the control magnitude. As long as new control impulses are issued at a sufficient frequency, the coupling 509 remains again ineffective and the switch 508 at rest in its reversed position. If the impulses cease to recur, the drive 510 becomes effective and returns switch 508 into the original position by rotating it another 180° in the direction of the arrow G. During this rotation, a temporary connection is established between contacts K and H, thereby causing the contact 524 to catch up with the control magnitude in a manner similar to that described above, except that now the motion is in the opposite direction.

The current source L may supply an intermittent current if it is desired to have the contact 214 move more than one step after each reversal of its direction of motion. The reversing switch 508 may also be coupled with the drive of the potentiometer contact 514 so that a separate driving motor is dispensed with and the mechanical part of the system designed as a structural unit. It will also be apparent that other types of time relays may be used, or that the mechanically operated coupling 509 may be replaced by an electric control of the switch, the relay armature 500' then being used as a movable control contact.

While systems of the type just described respond to up and down movements of the controlling magnitudes, they require a timing, within limits, of some of their members to the expected rate of change of the control magnitudes, or vice versa. These timing conditions can, as a rule, be complied with where the phenomena under observation are bound to occur slowly or within known or controllable limits of their rate of change. This is the case, for instance, when controlling or recording the operation of industrial furnaces, heating plants or other heat-operated systems which, due to their thermal capacity, exclude desultory changes of temperature. Similar conditions prevail when recording the energy requirements of a factory, the energy output of a power station, or when determining the measuring magnitudes of a controllable test such as the one described in conjunction with Fig. 1.

When such requirements cannot be met, or when a measuring system for magnitudes with a wider range of admissible rates of change is desired, or when desultory changes of the control magnitudes are to be responded to, a more direct control of the operating direction may be employed. The system shown in Fig. 9 exemplifies a control of this type.

According to Fig. 9, the two variable control elements 911 and 921 are connected in two bridge circuits respectively. The first circuit contains the element 911 in series with a constant resistor 912 and a slide wire resistor 913 whose movable contact 914 lies in the zero branch 919 together with a relay 915. Contact 914 is rotated by a shaft 932 connected with a recording drum 945 which in turn is driven by a synchronous motor 931 fed from the line 971 through leads 972. Hence, contact 914 and drum 945 rotate periodically in synchronism with each other. The second bridge circuit contains element 921 in series with a constant resistor 922 and a potentiometric balancing resistor 923. The movable potentiometer contact 924 is series connected with a relay 925' in the zero branch 929, and is mounted on a holder 943 of a stylus electrode 944. Contact 924 and stylus electrode 944 are reciprocated by a worm shaft 942 driven by a reversible motor 941, also fed from the line 971. The line also feeds the two measuring bridges through leads 974, 977 and 978.

The construction and operation of the system thus far described are similar to the corresponding parts of the system shown in Fig. 2, with the essential exception that the resistor 923 is not necessarily divided into steps and that the drive effected by motor 941 is not limited to one step at a time but may cover the whole path of motion in a continuous or intermittent operation. Motor 941 is controlled by the armature 926' in cooperation with the stationary contacts 927' and 928' of relay 925'. Motor 941 turns in one direction when contact 926' engages 927', as shown, and in the opposite direction when contact 926' engages 228'. Motor 941 is at rest when contact 926' is in the intermediate position, i. e., when the bridge is balanced and the zero branch 929 not energized, a polarized three-position relay 925' being used to obtain this operation.

When in operation, the relay armature 926' is in the neutral position and the contact assembly 924, 943, 944 at rest as long as the position of the assembly corresponds to the control magnitude supplied by element 921. When the magnitude changes, the zero branch 929 draws a current in either direction and causes relay 925' to energize the motor 941 over either contact 927' or 928'. Motor 941 now effects a follow-up movement tending to re-establish the balance condition of the bridge circuit. Hence, this device has always the tendency to keep stylus 944 in a balance-responsive position where the pilot circuit, described presently, is in condition to respond to the relay 915 of potentiometer contact 914.

The pilot circuit, connected to contacts 916, 917 and 918 of relay 915, is associated with a capacitive discharge circuit 981, 982 and 983 similar to those of the preceding embodiments, and extends over leads 984, 986 and 987 through the contact assembly 926, 927 and 928 of a relay 925 and the electrode members 944 and 945 of the recording mechanism. Relay 925 lies in a circuit which contains a current source 970 and a contactor 960 controlled by the armature 926'. This circuit is closed when the armature 926' is in the balance-responsive, i. e., neutral, position and open when the armature 926' engages either contact 927' or 928'. Relay 925 is preferably of the retarded type so as to keep contact 926 in engagement with contact 927 for a given period after each energization, this period being preferably longer than one full cycle of rotating contact 914. When armature 926 is in the non-responsive position shown in the drawings, a shunt path 988, 989 lies across the pilot leads 984 and 987 in order to block a discharge of the capacitor through the recording mechanism.

961 denotes the drive motor of a time-marking device. The motor is energized through leads 965 from line 971, and rotates a cam gear 963 in proportion to time. The cam controls a contact 968 intermittently in equal intervals of time and thereby causes an auxiliary capacitive circuit 981', 982', 983' to be alternatively charged and discharged. The discharge passage through connections 986' and 987 into the pilot circuit and the recorder members 944 and 945. As a result, a number of time marks are superimposed on the record, as will presently be explained more in detail.

When in operation, the stylus 944 is usually in balance position, the contactor 960 closed, relay 925 energized, and contact 926 in engagement with contact 927. As soon as the periodically operating potentiometer contact 914 passes through the balance point, relay 915 causes movable contact 916 to switch over to contact 918 and to discharge capacitor 983 through 984, 926, 927, 986, 945, 944 and 987. This causes the stylus 944 to produce a mark on a discharge-responsive recording sheet placed on the drum electrode 945. When the response of relay 915 occurs while contact 944 is just performing a follow-up motion, the contactor 960 is in open position and relay 925 apt to be already de-energized. If this is the case, the discharge from capacitor 983 is bypassed at 926, 927 through path 988, 989, and remains without effect on the recording mechanism.

The resulting record, as shown in Fig. 10, is represented on the recording sheet 905 by a train of marks 906 which form a curve which is indicative of the two variable magnitudes supplied by elements 911 and 921. Since the time-marking device is connected with the same recorder electrodes, the time marks 907 appear superposed on, or in proximity to, the recorded curve and thus indicate directly the proper correlation of the time marks to the corresponding points of the curve. The discharge circuit of the time-marking device is preferably designed to supply an electrode voltage or current higher than that of the other discharge circuit so that the time marks 907 are clearly distinguished from those of the curve by having a larger diameter.

The time-marking feature of the system of Fig. 9 is related to disclosure in my copending application entitled "Three-magnitude recorder," Serial No. 470,440, filed December 29, 1942.

The use of a follow-up principle in one of the two measuring devices of a system according to Fig. 9 has the advantage that it lends itself readily to be being controlled by fast-changing or desultory phenomena. One of its characteristics is also that the speed of rotation of the periodically operating potentiometer is largely independent of the operation of the follow-up device and may be varied within very wide limits. For instance, a relatively slow-acting potentiometer drive may be applied.

I claim:

1. In an electric system for controlling a mechanism in dependence upon a function of two variable control quantities, said mechanism having two cooperative members each being movable at an angle to the motion of the other, an impulse-transmitting pilot circuit connected with said mechanism for rendering said members operative when they are in a relative position substantially corresponding to said function, two measuring devices each containing a variable element responsive to one of said quantities respectively and an independently variable element and having a relay connected with said two elements to be differentially controlled by both so as to respond to the passage of their differential control effect through a given differential value, said relays being both arranged in said pilot circuit for controlling said circuit to become operative when both relays are in responsive condition, cyclically operating drive means for actuating one of said mechanism members and said independently variable element of one of said measuring devices in synchronism with each other so as to establish said differential value in said one device whenever said mechanism member passes through a position indicative of said variable control magnitude effective in said one device, stepwise operating actuating means for actuating the other mechanism member and said independently variable element of said other measuring device in synchronism with each other so as to establish said differential value in said other device whenever the position of said other mechanism member is indicative of said other control magnitude, said actuating means being connected with said pilot circuit to be controlled thereby so as to move one step each time said mechanism becomes operative.

2. An electric system for recording a function of two variable quantities, comprising in combination a recording device having a rotary member for accommodating a recording sheet and a stylus member movable relative to said rotary member for producing a record on said sheet, two balanceable measuring devices each including a variable control element responsive to one of said quantities respectively and an independently variable balancing element and having a relay connected with said two elements and controlled thereby so as to respond to the passage of the ratio of the control effects of said elements through a given value, periodically operating drive means for varying said balancing element of one of said devices in synchronism with the rotation of said rotary recorder member, actuating means for varying said balancing member of said other device in synchronism with the motion of said stylus member, the operating periods of said drive means and actuating means respectively being different from each other so that one of said means completes one cycle in a period of time including a multitude of complete cycles of the other means, and an impulse-transmitting pilot circuit connected with said recording device to be jointly controlled by said two relays for causing said stylus member to effect a recording mark at the moment when both relays are placed in responsive condition.

3. An electric system for recording a function of two variable control quantities, comprising in combination a recording device having a rotary member for accommodating a recording sheet and a stylus member movable relative to said rotary member for producing a record on said sheet, two balanceable measuring devices each including a variable control element responsive to one of said quantities respectively and an independently variable balancing element and having a relay connected with said two elements so as to be controlled by both in response to the passage of their control effects through a given ratio periodically operating drive means for varying said balancing element of one of said devices in synchronism with the rotation of said rotary recorder member, stepwise operating means for actuating said balancing member of said other and said stylus intermittently and in synchronism with each other, the operating period of said actuating means for completing one step of actuation being timed to include at least one full operating period of said drive means, an impulse-transmitting pilot circuit connected with said recording device and controlled by said two relays for causing said stylus member to effect a recording mark at the moment when both relays are placed in responsive condition.

4. An electric system for recording a function of two variable control quantities, comprising in combination a recording device having a rotary member for accommodating a recording sheet and a stylus member movable relative to said rotary member for producing a record on said sheet, two balanceable measuring circuits each including a variable circuit element responsive to one of said quantities respectively and a potentiometric balancing device and having a relay connected with both said element and said potentiometric device so as to be responsive to the balance condition of said measuring circuit, periodically operating drive means for operating said rotary member and one of said potentiometric devices in synchronism with each other, stepwise-operating actuating means connected with said stylus and said other potentiometric device for moving them intermittently in synchronism with each other, said actuating means having an operating period, as regards the completion of a full cycle of operative steps, which includes a multitude of full-cycle operating periods of said drive means, and an impulse-transmitting pilot circuit connected with said recording device and controlled by said relays of both said measuring devices for causing said stylus member to effect a recording mark at the moment when both relays are placed in balance responsive condition.

5. An electric system for recording a function of two variable measuring quantities, comprising in combination a recorder having a rotary member for accommodating a recording sheet and a reciprocatory stylus member relative to said drum member for producing recording marks on said sheet, two balanceable measuring devices each including a variable control element responsive to one of said quantities respectively and an independently variable balancing element and having a relay connected with said two elements so as to be differentially controlled thereby in response to the passage of their control effects through a given differential value, periodically operating drive means for varying said balancing element of one of said devices in synchronism with the motion of one of said recorder members, stepwise-operating actuating means connected with said other balancing element and said other recorder member for moving them intermittently in synchronism with each other over a graduated range of progression, an impulse-transmitting pilot circuit connected with said recorder and controlled by said two relays for causing said stylus member to produce a recording mark at the moment when both relays are placed in responsive condition, and control means connected with said actuating means for causing them to advance one step along their path of progression in dependence upon each recording operation of said stylus member.

6. An electric system for recording a function of two variable measuring quantities, comprising in combination a recorder having a rotary member for accommodating a discharge-responsive recording sheet and a reciprocatory stylus member movable relative to said rotary member for producing recording marks on said sheet, said two recorder members forming electrodes for passing a discharge through said sheet when energized, two adjustable measuring devices each including a variable control element operative in response to one of said quantities respectively and a relay responsive to the adjustment of the device indicative of said quantity, periodically operating drive means for varying the adjustment of one of said measuring devices in a given cycle in synchronism with the motion of one of said recorder members, actuating means connected with said other measuring device and said other recorder member for varying their respective adjustments in synchronism with each other, a pilot circuit connected between said two relays and said recorder for controlling the latter in dependence upon both relays being in responsive condition, current supply means and a capacitor connected with said pilot circuit through one of said relays whereby said capacitor is connected with said supply means for charging when said latter relay is in non-responsive condition and with said pilot circuit for discharge through said recorder members and sheet when said latter relay is in responsive condition, said other relay being arranged so as to block the discharge of said capacitor through said members as long as said other relay is in non-responsive condition.

7. A measuring system for determining a function of two variable quantities, comprising in combination two measuring devices each having a variable measuring element responsive to one of said quantities respectively and an adjusting element variable independently of said quality and having a relay connected with said two elements so as to be controlled thereby in dependence upon said adjusting element passing through an adjustment indicative of said quantity, a mechanism having two cooperative members each being movable at an angle to the motion of the other, an impulse-transmitting pilot circuit connected with said mechanism for rendering said members operative when they are in a relative position substantially corresponding to said function, periodically operating drive means for actuating one of said mechanism members and said adjusting element of one of said measuring devices in synchronism with each other, actuating means for actuating said other mechanism member and said adjusting element of said other measuring device in synchronism with each other, said pilot circuit being connected with said two relays so as to be controlled thereby to become operative when both relays are in responsive condition, and control means for causing said actuating means to effect a one-step motion in response to each operation of said pilot circuit, whereby said mechanism is caused to operate in accordance with said function of said two variable quantities.

8. A measuring system for determining a function of two variable quantities, comprising in combination two measuring devices each having a variable control element operative in accordance with one of said quantities respectively and an adjusting element variable independently of said quantity, and including a relay connected with said two elements so as to be controlled by both in dependence upon said adjustable element passing through an adjustment indicative of said quantity, a mechanism having two cooperative members each being movable at an angle to the motion of the other, an impulse-transmitting pilot circuit connected with said mechanism for rendering said members operative when they are in a relative position substantially corresponding to said function, periodically operating drive means for actuating one of said mechanism members and said adjusting element of one of said measuring devices in synchronism with each other, actuating means for actuating the other mechanism member and said adjusting element of said other measuring device in synchronism with each other, said pilot circuit being connected with said two relays so as to be controlled thereby to become operative when both relays are in responsive condition in order to cause said mechanism to operate in accordance with said function, and a capacitive discharge circuit controlled by said relay of said device which has its adjusting element periodically actuated by said drive means, said discharge circuit including a current source and being connected with said latter relay and said pilot circuit so as to be charged when said latter relay is in non-responsive condition and discharged into said pilot circuit when said latter relay is in responsive condition, and a discharge path connected with said pilot circuit for short-circuiting said discharge in order to render it ineffective as regards said mechanism when said other relay is in non-responsive condition.

9. A measuring system for determining a function of two variable quantities, comprising in combination two measuring devices each having a variable measuring element for producing a control effect in accordance with one of said quantities respectively and an adjusting element for producing another control effect variable independently of said quantity, and including a relay connected with said two elements so as to be differentially controlled in dependence upon said two control effects in order to respond to the passage of said effect through a given differential value, a mechanism having two cooperative members each being movable at an angle to the motion of the other, an impulse-transmitting pilot circuit connected with said mechanism for rendering said members operative when they are in a relative position substantially corresponding to said function, periodically operating drive means for actuating one of said mechanism members and said adjusting element of one of said measuring devices in synchronism with each other, reversible actuating means for actuating said other mechanism member and said adjusting element of said other device in synchronism with each other, said actuating means being controlled by said relay of said latter device so as to remain at rest, when the position of said latter mechanism member is indicative of said other control magnitude, and in motion in either direction for effecting a follow-up movement when said position is not in accordance with said other control magnitude, said pilot circuit being connected with said two relays so as to be controlled thereby when both are in responsive condition, whereby said mechanism is caused to operate in accordance with said function of said two variable magnitudes.

10. A measuring system for determining a function of two variable magnitudes, comprising in combination two measuring devices each having a variable control element for producing a control effect responsive to one of said quantities respectively and an adjusting element for producing another control effect variable independently of said quantity, and including a relay connected with said two elements so as to be controlled by said two control effects in order to become operative in dependence upon said adjustable element passing through the adjustment indicative of said one quantity, a recording mechanism having two cooperative members each being movable at an angle to the motion of the other, an impulse-transmitting pilot circuit connected with said mechanism for rendering said members operative when they are in a relative position substantially corresponding to said function, periodically operating drive means for actuating one of said mechanism members and said adjusting element of one of said measuring devices in synchronism with each other, actuating means for actuating the other mechanism member and said adjusting element of said other measuring device in synchronism with each other, said pilot circuit being connected with said two relays so as to be controlled thereby in order to become operative when both are placed in responsive condition whereby said mechanism is caused to produce a record representing a function of said two variable magnitudes, and timing means associated with said recording mechanism for placing time marks on said record of said function, said timing means comprising a control device operating in proportion to time and intermittently operating marking means for producing said time marks in given intervals of time independent of the variations of said two quantities.

11. In an electric recording system as set forth in claim 2, a time marking device associated with said recording device and comprising another stylus member reciprocable along said rotary member, means in driving connection with said other stylus member for actuating it in proportion to time so as to produce time marks on the aforesaid recording sheet of said recording device in given intervals independently of the operation of said first-mentioned stylus member.

12. In a system as set forth in claim 2, time marking means associated with said recording device and comprising a time marker circuit connected with said recording device, and means operating in proportion to time for energizing said latter circuit in given intervals of time so as to cause said stylus member to superimpose on said recording spaced time marks independently of the variations of said two control magnitudes.

13. An electric system for recording a function of the quantities of two variable phenomena, comprising in combination a recording device having a rotary member for accommodating a recording sheet and a stylus member movable relative to said rotary member for producing a record on said sheet, two balanceable measuring devices each including a variable control element responsive to one of said quantities respectively and an independently variable balancing element and having a relay connected with said two elements and controlled by both so as to assume a given condition when the control effects of said two elements as regards said relay pass through a given ratio, periodically operating drive means for varying said balancing element of one of said devices in synchronism with the rotation of said rotary recorder member, a step-switch in driving connection with said balancing element of said other device and said stylus for actuating said balancing member and said stylus intermittently and in synchronism with each other, an impulse-transmitting pilot circuit connected with said recording device and controlled by said two relays for causing said stylus member to effect a recording mark at the moment when both relays are in said given condition, said step-switch being electrically connected with said pilot circuit to be controlled by the latter to progress one step each time said stylus has effected a recording mark.

14. In a system for controlling the operation of a mechanism in accordance with a function of the quantities of two variable phenomena, said mechanism having two normally idle running members arranged in cooperative relation for performing together, when actuated, the operation to be controlled, each of said members being movable at an angle to the motion of the other, pilot means for actuating said members at points of their relative travel corresponding to said function, two devices for measuring said quantities respectively, each device having a driven adjusting member movable over a range which includes an adjusting position indicative of said respective quantity, drive means for moving one of said mechanism members and one of said adjusting members in synchronism with each other, actuating means for moving said other mechanism member and said other adjusting member in synchronism with each other, and relay means connecting said pilot means with said two devices so as to render said pilot means operative when said adjusting members are simultaneously in said respective positions.

15. A system for controlling the operation of an electrically actuated mechanism in accordance with a function of the quantities of two variable phenomena, comprising in combination two measuring devices each including a variable control element for measuring the quantity of one of said phenomena respectively and an adjustable balancing element and having a relay connected with said two elements and controlled thereby so as to assume a given condition when the control effects of said elements on said relay pass through a given differential value, drive means connected with said balancing element of one of said devices for varying the adjustment of said latter element independently of the variations of said appertaining control element, actuating means connected with said balancing element of said other device for varying the adjustment of said latter element, said mechanism to be controlled having two movable members arranged in cooperative relationship for performing together, when electrically actuated, the operation to be controlled, each of said mechanism members having a path of motion extending at an angle to that of the other and being connected with one of said drive means and actuating means respectively to move in synchronism therewith, and an electric pilot circuit connected between said relays and said mechanism and controlled by said relays to electrically actuate said members when both said relays are in said given position.

16. A system for controlling the operation of an electrically actuated mechanism in accordance with a function of the quantities of two variable phenomena, comprising in combination two balanceable measuring devices each including a variable control element for measuring the quantity of one of said phenomena respectively and an adjustable balancing element and having a relay connected with said two elements and controlled thereby so as to assume a given condition when the control effects of said elements on said relay pass through a given ratio, cyclically operating drive means connected with said balancing element of one of said devices for varying the adjustment of said latter element independently of the variations of said appertaining control element, actuating means connected with said balancing element of said other device for varying the adjustment of said latter element, an electric pilot circuit connected between said two relays and said actuating means for controlling said actuating means in dependence upon both said relays being in said given condition, said mechanism to be controlled having two movable members arranged in cooperative relationship for performing together, when electrically actuated, said mechanism operation to be controlled, each of said mechanism members having a path of motion extending at an angle to that of the other and being connected with one of said drive means and actuating means respectively to move in synchronism therewith, and said pilot circuit being also connected with said mechanism to electrically actuate said members when both said relays are in said given condition.

17. A system for controlling the operation of an electrically actuable mechanism in accordance with a function of two variable phenomena, comprising in combination two balanceable electric circuits each including a variable circuit element for measuring the variations of one of said phenomena respectively and an adjustable balancing element and having a relay connected with said two elements to be differentially controlled thereby in order to assume a given condition when their control effects pass through the balance condition, drive means connected with said balancing element of one of said circuits for varying its adjustment independently of the variations of said appertaining circuit element over a given range including the balance condition of said circuit, actuating means connected with said balancing element of said other circuit for varying the adjustment of said latter element over a range including the balance condition of said latter circuit, said mechanism to be controlled having two cooperative movable members for performing together, when electrically actuated, said mechanism operation to be controlled, each of said mechanism members having a path of motion extending at an angle to that of the other and being connected with one of said drive means and actuating means respectively to move in synchronism therewith and an electric pilot circuit connected between said two relays and said mechanism for actuating said mechanism members when both said relays are in said given condition.

18. A system for controlling the operation of an electrically actuable mechanism in accordance with a function of two variable phenomena, comprising in combination two balanceable electric circuits each including a variable circuit element for measuring the variations of one of said phenomena respectively and having an adjustable potentiometric device and a relay connected with said circuit element so that said relay is differentially controlled by both said element and said device in order to assume a given relay condition when the two control effects pass through a given differential value, drive means connected with one of said potentiometric devices for varying its adjustment independently of the variations of said appertaining circuit element, actuating means connected with said other potentiometric device for varying its adjustment, an electric pilot circuit connected with said two relays so as to be operative only when both relays are simultaneously in said given condition, said mechanism to be controlled having two cooperative members for performing together, when electrically actuated, said mechanism operation to be controlled, each of said mechanism members being movable at an angle to the motion of the other, control means connected with one of said members for moving it in synchronism with said drive means, and other control means connected with said other member for moving it in synchronism with said actuating means, said pilot circuit being connected with said mechanism to electrically actuate said members when said pilot circuit is rendered operative by said relays.

19. A system for controlling the operation of an electrically actuated mechanism in accordance with a function of two variable phenomena, comprising in combination two balanceable electric measuring circuits each including a variable circuit element responsive to variations of one of said phenomena respectively and an adjustable balancing element and having a relay connected with said two elements and controlled by both so as to assume a given condition when the two effects pass through a given differential value, drive means connected with one of said balancing elements to vary its adjustment independently of the variations of said appertaining circuit element, actuating means connected with said other balancing element for varying its adjustment, an electric pilot circuit connected with said two relays so as to be controlled thereby to become operative only when both relays are in said given condition, said mechanism to be controlled having two cooperative members for performing together, when electrically actuated, said mechanism operation to be controlled, each of said mechanism members being movable at an angle to the motion of the other, separate control means connected with said two members respectively for moving them in synchronism with the adjustment of said two respective balancing elements, said pilot circuit being connected with said actuating means and also with said mechanism for rendering said actuating means operative and actuating said mechanism members when said pilot circuit is rendered operative by said relays.

20. In an electric system for controlling the operation of a mechanism in dependence upon a function of the quantities of two variable phenomena, said mechanism having two members arranged in cooperative relationship to each other for performing when actuated electrically, the operation to be controlled, each of said members being movable at an angle to the motion of the other, an impulse-transmitting pilot circuit connected with said mechanism for electrically actuating said mechanism when said members are in a position relative to each other substantially corresponding to said function, two measuring devices each containing a control element variable in accordance with one of said quantities respectively and an independently variable element and having a relay connected with both said elements so as to be differentially controlled thereby in order to assume a given relay condition when the control effects of said elements pass through a given differential value, cyclically operating drive means for actuating one of said mechanism members and one of said independently variable elements of one of said devices in synchronism with each other so as to repeatedly establish said differential value in said one device each time said mechanism member passes through a position indicative of said one appertaining quantity, stepwise operating actuating means for actuating said other mechanism member and said independently variable element of said other measuring device in synchronism with each other so as to repeatedly establish said differential value in said other device each time the position of said other mechanism member is indicative of said other quantity, and a discharge circuit connected with said pilot circuit under control by one of said relays in order to be placed in discharge condition when said relay is in said given condition, said other relay being disposed in said pilot circuit to block the discharge of said discharge circuit through said pilot circuit unless it is also in said given condition.

21. In an electric system for controlling the operation of a mechanism in dependence upon a function of the quantities of two variable phenomena, said mechanism having two cooperative members arranged relative to each other for performing, when electrically actuated, the operation to be controlled, each of said members being movable at an angle to the motion of the other, an impulse-transmitting pilot circuit connected with said mechanism for electrically actuating it when said members are in a position relative to each other substantially corresponding to said function, two measuring devices each containing a measuring element varying in accordance with one of said quantities respectively and an independently variable element and having a relay connected with both said variable element and having a relay connected with both said variable elements to be differentially controlled thereby so as to assume a given relay condition when their control effects pass through a given differential value, said relays being both arranged in said pilot circuit for controlling said circuit to actuate said mechanism when both relays are in said given condition, cyclically operating drive means for moving one of said mechanism members and actuating said independently variable element of one of said measuring devices in synchronism with each other so as to establish said differential value in said device each time said mechanism member moves through a position indicative of said one quantity, stepwise operating actuating means for moving said other mechanism member and actuating said independently variable element of said other measuring device in synchronism with each other so as to establish said differential value in said other device each time the position of said other mechanism member is indicative of said other quantity, said actuating means having a lower speed of operation than said drive means so that said drive means perform a multiple of cycles while said actuating means pass once through their range of steps.

GEORGE KEINATH.